United States Patent [19]
Wachi et al.

[11] Patent Number: 5,383,256
[45] Date of Patent: Jan. 24, 1995

[54] ROPE CINCHING DEVICE

[76] Inventors: Leslie S. Wachi, P.O. Box 27, Honokaa, Hi. 96727; Jeremy J. Kelley, P.O. Box 5238, Hilo, Hi. 96720

[21] Appl. No.: 38,158

[22] Filed: Mar. 26, 1993

[51] Int. Cl.⁶ .............................................. A44B 21/00
[52] U.S. Cl. ...................................................... 24/71.1
[58] Field of Search ...................... 24/71.1, 71.2, 71.3, 24/68 F, 129 R, 129 C

[56] References Cited

U.S. PATENT DOCUMENTS

| | | | |
|---|---|---|---|
| 316,039 | 4/1885 | Irvine | 24/71.3 |
| 1,476,026 | 12/1923 | Barber | 24/71.2 |
| 1,574,857 | 3/1926 | Barneck | 24/71.3 |
| 1,586,174 | 5/1926 | Bell | 24/71.3 |
| 1,725,130 | 8/1929 | Ciferskor | 24/71.3 |
| 2,466,083 | 4/1949 | Crosby . | |
| 2,679,082 | 5/1954 | Himberger | 24/71.3 |
| 3,879,805 | 4/1975 | Gretter | 24/71.3 |
| 4,092,075 | 5/1978 | Kimball . | |
| 4,414,712 | 11/1983 | Beggins . | |
| 4,941,434 | 7/1990 | Ellwanger . | |

FOREIGN PATENT DOCUMENTS 276220 9/1951 Switzerland .......................... 24/129

Primary Examiner—Richard A. Bertsch
Assistant Examiner—Roland G. McAndrews, Jr.
Attorney, Agent, or Firm—John R. Flanagan

[57] ABSTRACT

A cinching device for tightening a rope being restrained at opposite ends includes an elongated rigid rod-like member and first, second and third elements mounted on and spaced along the elongated rod-like member. The elongated rod-like member has a handle defined at one end. The first element defines a first surface portion around which to extend a flexible rope in a first direction. The second element defines a second surface portion around which to extend the flexible rope in a second direction being generally opposite to the first direction so as to form a section of the flexible rope into a substantially serpentine-shaped configuration thereby reducing the rope in length and taking up any slack in the rope so as to place the rope in a tightened condition. The third element defines a third surface portion around which to extend the flexible rope so as to retain the flexible rope section in the substantially serpentine-shaped configuration and thereby retain the rope in the tightened condition.

9 Claims, 2 Drawing Sheets

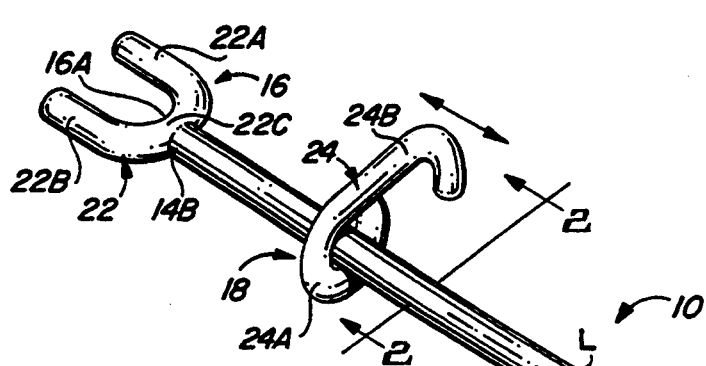
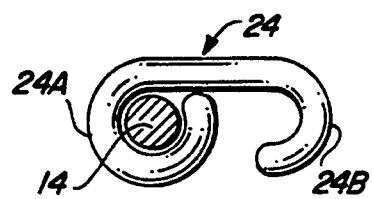
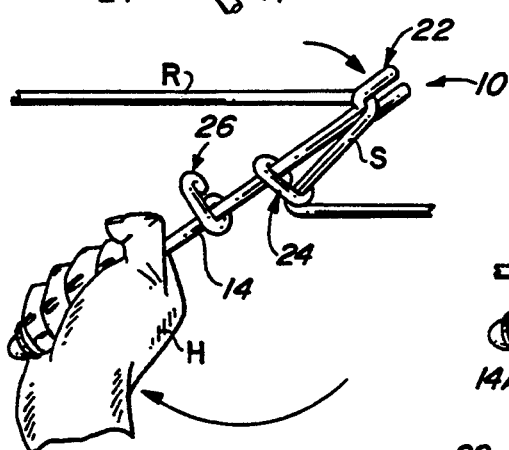
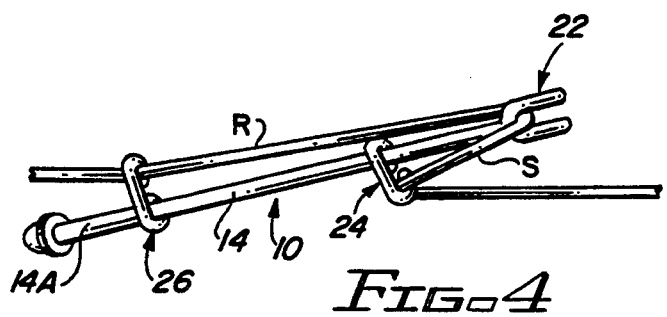
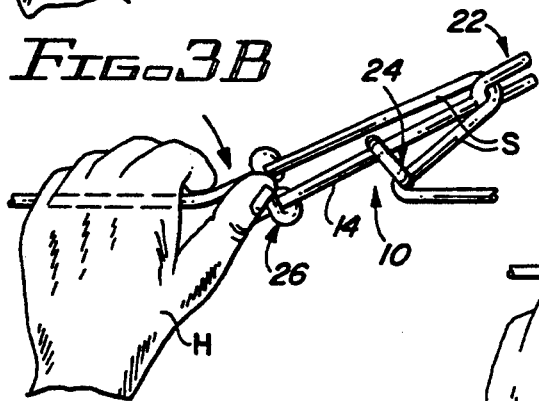
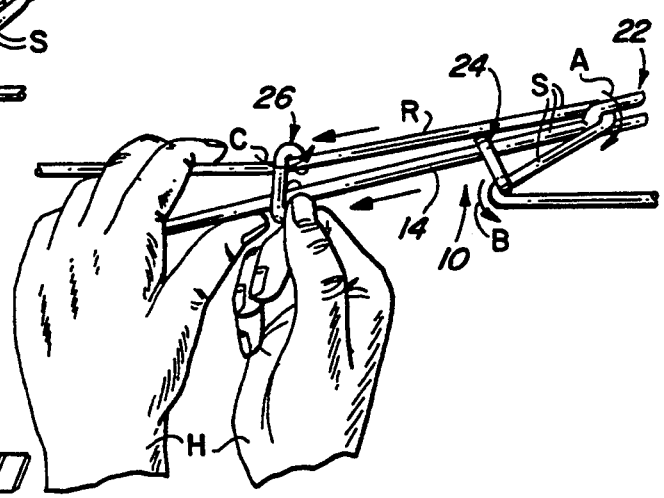

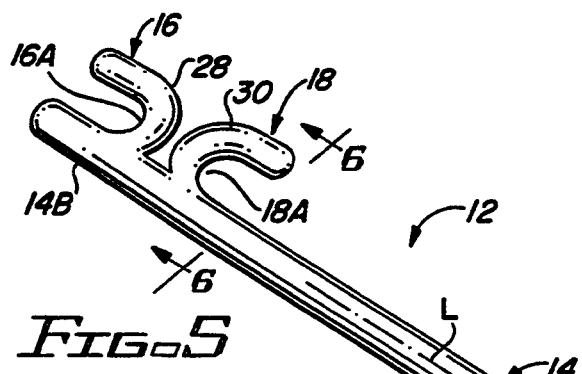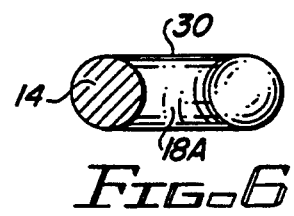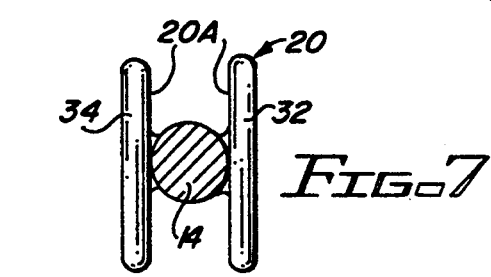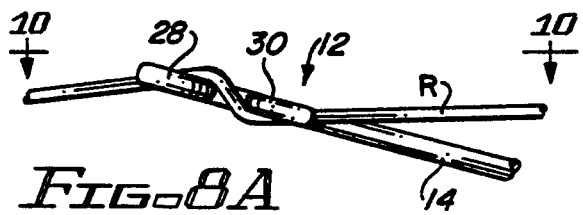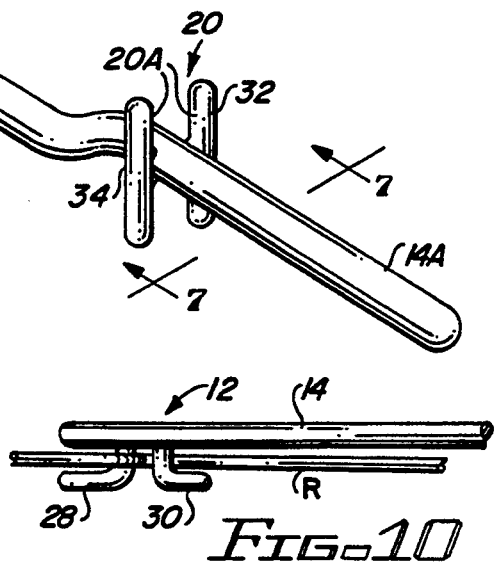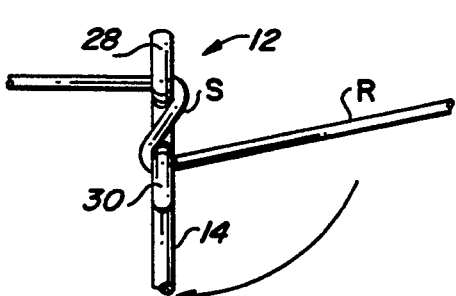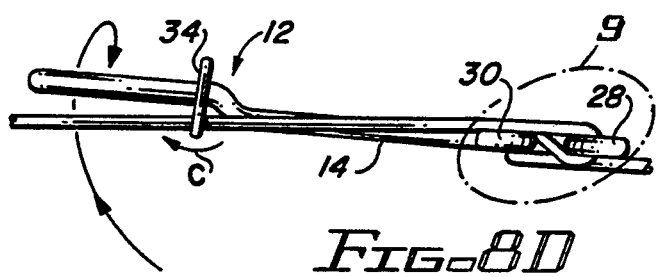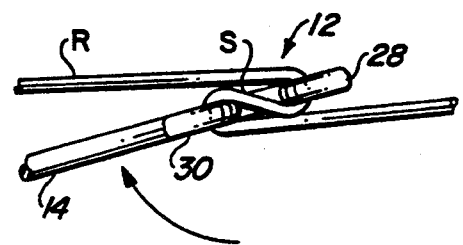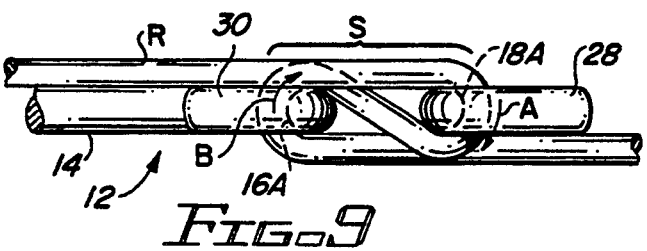

5,383,256

ROPE CINCHING DEVICE

BACKGROUND OF THE INVENTION

1. Field of the Invention

The present invention generally relates to devices for tightening a rope by taking up the slack therein and, more particularly, is concerned with a cinching device for tightening a rope being restrained at opposite ends.

2. Description of the Prior Art

A variety of different types of flexible lines, which for purposes of brevity hereafter will all be referred to as a rope, are widely used to secure an object or load. One end of the rope is attached to the object or to a canopy covering the object, while the other end is attached to the ground or another anchoring structure. To ensure that the object is adequately anchored, the slack in the rope must be eliminated by drawing the rope into a taut condition.

This is difficult to achieve while concurrently securing the respective opposite ends of the rope. One approach followed in the prior art for overcoming this difficulty is to utilize various devices designed for securing the ends of the rope to the desired locations in a manner which also permits adjustment of the tension in the rope. Representative examples of devices employing this approach are the ones disclosed in U.S. Pat. No. (2,466,083) to Crosby, Kimball (U.S. Pat. No. 4,092,075) and Beggins (U.S. Pat. No. 4,414,712). While many prior art devices employing this approach may function adequately under the range of conditions for which they were designed, none is perceived as being a satisfactory solution which fully overcomes the difficulty encountered heretofore.

Consequently, a need still exists for a rope cinching device which will overcome the difficulty associated with securing a rope and also removing slack from a rope.

SUMMARY OF THE INVENTION

The present invention provides a rope cinching device designed to satisfy the aforementioned need. The rope cinching device of the present invention has a relatively simple design which makes the cinching device inexpensive to manufacture and quick and easy to use.

Accordingly, the present invention is directed to a cinching device for tightening a rope being restrained at opposite ends. The rope cinching device comprises: (a) an elongated member having a handle defined at one end; (b) a first element mounted on the elongated member defining a first surface portion around which to extend a flexible rope in a first direction; (c) a second element mounted on the elongated member and spaced from the first element, the second element defining a second surface portion around which to extend the flexible rope in a second direction being generally opposite to the first direction so as to form a section of the flexible rope into a substantially serpentine configuration thereby reducing the rope in length and taking up any slack in the rope so as to place the rope in a tightened condition; and (d) a third element mounted on the elongated member and spaced from the first and second elements, the third element defining a third surface portion around which to extend the flexible rope so as to retain the flexible rope section in the substantially serpentine-shaped configuration and thereby retain the rope in the tightened condition.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of one embodiment of a rope cinching device in accordance with the present invention.

FIG. 2 is an enlarged cross-sectional view of the rope cinching device taken along line 2—2 of FIG. 1.

FIGS. 3A, 3B, 3C and 3D are perspective views of a sequence of positions through which the rope cinching device of FIG. 1 is manipulated to accomplish tightening of a rope.

FIG. 4 is a perspective view of the rope cinching device of FIG. 1 shown in the final position after tightening of the rope has been accomplished.

FIG. 5 is a perspective view of another embodiment of a rope cinching device in accordance with the present invention.

FIG. 6 is an enlarged cross-sectional view of the rope cinching device taken along line 6—6 of FIG. 5.

FIG. 7 is another enlarged cross-sectional view of the rope cinching device taken along line 7—7 of FIG. 5.

FIGS. 8A, 8B, 8C and 8D are perspective views of a sequence of positions through which the rope cinching device of FIG. 5 is manipulated to accomplish tightening of a rope.

FIG. 9 is an enlarged view of the portion of the rope cinching device enclosed in the oval 9 of FIG. 8D.

FIG. 10 is a top plan view of the device as seen along line 10—10 of FIG. 8A.

DETAILED DESCRIPTION OF THE INVENTION

Referring to the drawings and particularly to FIGS. 1 and 5, there is illustrated preferred embodiments of a rope cinching device of the present invention, being respectively designated 10 and 12. The respective cinching devices 10, 12 are each configured for quick and easy use in tightening a rope R which is restrained in some manner at its opposite ends (not shown).

Each of the rope cinching devices 10, 12 includes an elongated member 14 and first, second and third elements 16, 18 and 20 mounted on and spaced along the elongated rigid member 14. The elongated member 14 has a substantially rigid rod-like construction and a handle 14A defined by one end of the elongated member 14. The first element 16 is located at the other end 14B of the elongated member 14 being opposite the handle 14A. The first element 16 defines a first surface portion 16A around which to extend the flexible rope R in a first direction A. The second element 18 defines a second surface portion 18A around which to extend the flexible rope R in a second direction B being generally opposite to the first direction A. By extending the rope R around the second element 18, a short section S of the flexible rope R is changed from a substantially straight configuration to a substantially serpentine-shaped configuration such that the rope R is reduced in length so as to take up slack in the rope R and thereby tighten the rope. The third element 20 defines a third surface portion 20A around which to extend the flexible rope R so as to retain the flexible rope section S in the serpentine-shaped configuration and thereby retain the rope R in the taut or tightened condition. The term "serpentine" configuration as used herein is meant to include zig-zag, switchback, Z-shaped, S-shaped or similar configurations.

Referring to FIGS. 1, 2, 3A-3D and 4, there is illustrated the first embodiment of the rope cinching device 10. In the first embodiment, the first element 16 of the rope cinching device 10 is in the form of a bifurcated-shaped element 22 attached on the other end 14B of the elongated rod-like member 14 opposite from the handle end 14A. The bifurcated-shaped element 22 has a pair of leg portions 22A, 22B and a bight portion 22C rigidly interconnecting the leg portions 22A, 22B and being rigidly attached to the end 14B of the elongated rod-like member 14. The first surface portion 16A, about which to extend the flexible rope R in the first direction A (FIG. 30), is defined on the bight portion 22B. The leg portions 22A, 22B of the bifurcated-shaped element 22 are respectively disposed on opposite sides of a longitudinal axis L defined by the elongated rod-like member 14 and extend away from the other end 14B of the elongated rod-like member 14 in a generally parallel relationship to the longitudinal axis L. The bight portion 22C of the bifurcated-shaped element 22 extends in opposite directions away from the other end 14B of the elongated rod-like member 14 in a generally transverse relationship to the longitudinal axis L.

Also, in the first embodiment of the rope cinching device 10, the second and third elements 18, 20 are first and second slideable hook-like elements 24, 26, respectively. The first and second slideable hook-like elements 24, 26 are mounted to the elongated rod-like member 14 so as to be capable of individually undergoing sliding movement therealong between and toward and away from the handle end 14A and the bifurcated-shaped element 22 of the device 10. The first and second slideable hook-like elements 24, 26 can also undergo sliding movement along the elongated rod-like member 14 toward and away from each other. The first slideable hook-like element 24 defines the second surface portion 18A around which to extend the flexible rope R in the second direction B (FIG. 30), being opposite to the first direction A, so as to form the section S of the flexible rope R into the substantially serpentine configuration which reduces the rope R in length. The second slideable hook-like element 26 defines the third surface portion 20A around which to extend the flexible rope R so as to retain the flexible rope section S in the substantially serpentine-shaped configuration. Overall, the first and second slideable hook-like elements 24, 26 have G-shaped configuations and respective annular portions 24A, 26A and hook portions 24B, 26B rigidly connected to the annular portions 24A, 26A.

The respective annular portions 24A, 26A of the first and second slideable hook-like elements 24, 26 encircle and are loosely fitted about the elongated rod-like member 14 so as to permit the desired slideable movement, but also to permit a slight rocking motion of the first and second slideable hook-like elements 24, 26 relative to the elongated rod-like member 14 in the general direction of the longitudinal axis L thereof in the tension of the rope R so as to cause a binding action to occur between the elongated rod-like member 14 and each of the first and second hook-like elements 24, 26 which, when desired, prevents inadvertent sliding movement of the first and second hook-like elements 24, 26 along the elongated rod-like member 14. The respective hook portions 24B, 26B project outwardly from the corresponding annular portions 24A, 26A so as to laterally capture and confine the rope R as it passes around the respective second and third surface portions 18A, 20A defined on the first and second slideable hook-like elements 24, 26. FIGS. 3A-3D illustrate the sequence of successive positions through which the first embodiment of the rope cinching device 10 is manipulated by the user's hands H to accomplish tightening of the rope R. FIG. 4 shows the rope cinching device 10 in the final position after tightening of the rope R has been accomplished and the device 10 has been released by the hands H of the user.

Referring to FIGS. 5-7, 8A-8D, 9 and 10, there is illustrated the second embodiment of the rope cinching device 10. In the second embodiment of the cinching device 10, the first and second elements 16, 18 are a pair of first and second arcuate-shaped hook-like elements 28, 30 fixedly attached on the other end 14B of the elongated rod-like member 14 opposite from the handle end 14A. Thus, the arcuate-shaped hook-like elements 28, 30 cannot be moved relative to the elongated rod-like member 14. Also, the arcuate-shaped hook-like elements 28, 30 are disposed side-by-side to one another along the same side of the elongated rod-like member 14, but face in opposite directions. As an example, the first and second arcuate-shaped elements 28, 30 have respective back-to-back J-shaped configurations. The arcuate-shaped hook-like elements 28, 30 respectively define the first and second surface portions 16A, 18A around which to extend the flexible rope R respectively in first and second opposed directions A, B to one another so as to form the section S of the flexible rope R into the substantially serpentine-shaped configuration thereby reducing the rope in length and taking up slack in the rope R so as to place the rope R in the tightened condition.

Also, in the second embodiment of the rope cinching device 10, the third element 20 is a pair of first and second substantially straight elements 32, 34 spaced from the first and second arcuate-shaped hook-like elements 28, 30. The first and second straight elements 32, 34 are rigidly attached to the elongated rod-like member 14 in a substantially transverse relation thereto and adjacent to the handle end 14A of the elongated rod-like member 14. Also, the first and second straight elements 32, 34 are disposed on opposite sides of the elongated rod-like member 14 and extend generally parallel to one another and in perpendicular relationship to the longitudinal axis L of the elongated rod-like member 14. The straight elements 32, 34 define the third surface portion 20A around which to extend the flexible rope R so as to retain the flexible rope section S in the substantially serpentine-shaped configuration and thereby retain the rope R in the tightened condition. FIGS. 8A-8D illustrate the sequence of successive positions through which the second embodiment of the rope cinching device 12 is manipulated by the user's hands (not shown) to accomplish tightening of the rope R.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A cinching device for tightening a rope being restrained at opposite ends, said cinching device comprising:

(a) an elongated member having a pair of spaced opposite ends;

(b) a first element mounted on said elongated member defining a first surface portion around which to extend a flexible rope in a first direction;

(c) a second element mounted on said elongated member and spaced from said first element, said second element defining a second surface portion around which to extend the flexible rope in a second direction being generally opposite to the first direction so as to form a section of the flexible rope into a substantially serpentine-shaped configuration thereby reducing the rope in length and taking up any slack in the rope so as to place the rope in a tightened condition; and (d) a third element mounted on said elongated member and spaced from said first and second elements, said third element defining a third surface portion around which to extend the flexible rope so as to retain the flexible rope section in the substantially serpentine-shaped configuration and thereby retain the rope in the tightened condition;

(e) said second element being a first hook-like element mounted to said elongated member to undergo sliding movement therealong between said opposite ends of said elongated member and toward and away from said first element.

2. The device of claim 1 wherein said elongated member has a handle defined on one of said opposite ends thereof.

3. The device of claim 1 wherein said third element is a second hook-like element mounted to said elongated member to undergo sliding movement therealong between said opposite ends of said elongated member, said first and second hook-like elements also being slidably movable toward and away from one another.

4. The device of claim 3 wherein said first and second hook-like elements have G-shaped configurations.

5. A cinching device for tightening a rope being restrained at opposite ends, said cinching device comprising:

(a) an elongated member having a pair of spaced opposite ends;

(b) a first element mounted on said elongated member defining a first surface portion around which to extend a flexible rope in a first direction, said first element being a bifurcated-shaped element attached at one of said opposite ends of said elongated member, said bifurcated-shaped element having a pair of leg portions and a bight portion interconnecting said leg portions and being attached to said elongated member, said first surface portion being defined on said bight portion;

(c) a second element mounted on said elongated member and spaced from said first element, said second element defining a second surface portion around which to extend the flexible rope in a second direction being generally opposite to the first direction so as to form a section of the flexible rope into a substantially serpentine-shaped configuration thereby reducing the rope in length and taking up any slack in the rope so as to place the rope in a tightened condition, said second element being a first hook-like element mounted to said elongated member to undergo sliding movement therealong between said opposite ends of said elongated member and toward and away from said bifurcated shaped element; and (d) a third element mounted on said elongated member and spaced from said first and second elements, said third element defining a third surface portion around which to extend the flexible rope so as to retain the flexible rope section in the substantially serpentine-shaped configuration and thereby retain the rope in the tightened condition.

6. A cinching device for tightening a rope being restrained at opposite ends, said cinching device comprising:

(a) an elongated rigid rod-like member having a pair of opposite ends;

(b) a handle defined on one of said opposite ends of said rod-like member;

(c) a bifurcated-shaped element attached on the other of said opposite ends of said elongated member and defining a first surface portion around which to extend a flexible rope in a first direction;

(d) a first hook-like element mounted to said elongated rod-like member to undergo sliding movement therealong between said opposite ends of said elongated rod-like member and toward and away from said bifurcated shaped element, said first hook-like element defining a second surface portion around which to extend the flexible rope in a second direction being opposite to the first direction so as to form a section of the flexible rope into a substantially serpentine-shaped configuration and thereby reduce the rope in length; and (e) a second hook-like element mounted to said elongated rod-like member to undergo sliding movement therealong between said opposite ends of said elongated rod-like member, said first and second hook-like elements also being slidably movable toward and away from one another, said second hook-like element defining a third surface portion around which to extend the flexible rope so as to retain the flexible rope section in the substantially serpentine-shaped configuration.

7. The device of claim 6 wherein said bifurcated-shaped element has a pair of leg portions and a bight portion interconnecting said leg portions and being attached to said elongated member, said first surface portion being defined on said bight portion.

8. The device of claim 6 wherein said first and second hook-like elements have G-shaped configuations.

9. The device of claim 6 wherein said first and second hook-like elements have respective annular portions encircling and loosely fitted about said elongated rod-like member so as to permit a slight rocking motion of said first and second hook-like elements in directions generally parallel to said elongated rod-like member to cause a binding action between said elongated rod-like member and each of said first and second hook-like elements which prevents sliding movement thereof along said elongated rod-like member.

* * * * *